US012577476B2

(12) United States Patent
Li et al.

(10) Patent No.: US 12,577,476 B2
(45) Date of Patent: Mar. 17, 2026

(54) METHOD AND SYSTEM FOR TREATING HYDROCARBON-CONTAINING MIXTURE

(71) Applicants:CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Jingqiu Li, Shanghai (CN); Dejin Kong, Shanghai (CN); Xuguang Li, Shanghai (CN); Zongshuang Wang, Shanghai (CN); Huaying Li, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 344 days.

(21) Appl. No.: 18/248,664

(22) PCT Filed: Oct. 13, 2021

(86) PCT No.: PCT/CN2021/123475
§ 371 (c)(1),
(2) Date: Apr. 11, 2023

(87) PCT Pub. No.: WO2022/078370
PCT Pub. Date: Apr. 21, 2022

(65) Prior Publication Data
US 2023/0392086 A1 Dec. 7, 2023

(30) Foreign Application Priority Data

Oct. 15, 2020 (CN) .......................... 202011104622.0

(51) Int. Cl.
*C10G 55/06* (2006.01)
*C10G 7/00* (2006.01)

(52) U.S. Cl.
CPC ............... *C10G 55/06* (2013.01); *C10G 7/00* (2013.01); *B01J 2235/30* (2024.01);
(Continued)

(58) Field of Classification Search
CPC .... C10G 55/06; C10G 7/00; C10G 2300/104; C10G 2300/1044; C10G 2300/70;
(Continued)

(56) References Cited

U.S. PATENT DOCUMENTS

RE33,323 E * 9/1990 Roarty .................... C10G 61/04
208/138
6,051,128 A * 4/2000 Nacamuli .............. C10G 59/06
585/419
(Continued)

FOREIGN PATENT DOCUMENTS

| CN | 1923965 A | 3/2007 |
|----|-----------|--------|
| CN | 101767035 B | 1/2012 |

(Continued)

*Primary Examiner* — Randy Boyer
*Assistant Examiner* — Juan C Valencia
(74) *Attorney, Agent, or Firm* — NKL Law; Allen Xue

(57) ABSTRACT

A method for processing a hydrocarbon-containing mixture includes the steps of: I) separating the hydrocarbon-containing mixture into a light fraction and a heavy fraction; II) reacting the light fraction from step I) in an aromatization unit and separating the resulting reaction product into a $C_5^-$ component and a $C_6^+$ component; III) reacting the heavy fraction from step I) and optionally the $C_6^+$ component from step II) in an aromatics conversion unit and separating the (Continued)

resulting reaction product into a $C_5^-$ component, a $C_6$-$C_7$ component, a $C_8$ component, and a $C_9^+$ component; and IV) optionally, steam cracking or catalytic cracking one or both of the $C_5^-$ component from step II) and the $C_5^-$ component from step III). The method can convert low-value hydrocarbon mixtures into $C_8$ aromatic hydrocarbons and cracking raw materials, and improve the product value. A system for practicing this method is also provided.

17 Claims, 5 Drawing Sheets

(52) U.S. Cl.
CPC .................. *C10G 2300/104* (2013.01); *C10G 2300/1044* (2013.01); *C10G 2300/70* (2013.01); *C10G 2400/30* (2013.01)

(58) Field of Classification Search
CPC .... C10G 2400/30; C10G 35/06; C10G 65/16; C10G 67/00; C10G 69/00; C10G 2400/20; C10G 57/00; C10G 2300/4006; C10G 2300/4012; C10G 2300/4018; C10G 11/02; B01J 2235/30; B01J 29/7869; B01J 29/7876; B01J 35/19; B01J 35/396; B01J 2229/186; B01J 2229/42; B01J 29/26; B01J 29/18; C07C 6/126; C07C 2529/26; C07C 2/00; C07C 5/27; C07C 6/12; C07C 7/00; C07C 15/067; Y02P 20/52

See application file for complete search history.

(56) References Cited

U.S. PATENT DOCUMENTS

| | | |
|---|---|---|
| 2012/0149958 A1 | 6/2012 | Ellrich et al. |
| 2014/0100398 A1 | 4/2014 | Jin et al. |
| 2015/0321976 A1 | 11/2015 | Larson et al. |
| 2015/0376086 A1 | 12/2015 | Tinger et al. |
| 2016/0362618 A1 | 12/2016 | Oprins et al. |
| 2020/0017773 A1 | 1/2020 | Ramamurthy et al. |

FOREIGN PATENT DOCUMENTS

| | | |
|---|---|---|
| CN | 104557431 A | 4/2015 |
| EA | 32758 B1 | 7/2019 |
| JP | 2002504180 A | 2/2002 |
| JP | 2014508109 A | 4/2014 |
| RU | 2583792 C2 | 5/2016 |
| WO | 2018127812 A1 | 7/2018 |
| WO | 2020159512 A1 | 8/2020 |

* cited by examiner

METHOD AND SYSTEM FOR TREATING HYDROCARBON-CONTAINING MIXTURE

CROSS REFERENCE TO RELATED APPLICATIONS

This application is a U.S. national stage entry of PCT International Application No. PCT/CN2021/123475, filed on Oct. 13, 2021, which claims priority to a Chinese patent application No. 202011104622.0, titled "system and method for utilizing hydrocarbon-containing mixtures", filed on Oct. 15, 2020, the contents of which are incorporated herein by reference in its entirety.

TECHNICAL FIELD

The present application relates to processing of hydrocarbons, and particularly to a method and system for processing a hydrocarbon-containing mixture.

BACKGROUND ART

Aromatics and olefins are basic raw materials of petrochemical industry, paraxylene is a main aromatic hydrocarbon product, of which the domestic supply gap reaches more than 1000 million tons per year, and ethylene and propylene have huge supply and demand gaps. Accelerating the development of the aromatic and olefin industries is vital to the development of the basic chemical industry in China. In industrial plants, naphtha is mainly used as a raw material, aromatic hydrocarbons are produced through catalytic reforming process, and then toluene/benzene and $C_9^+A$ are converted into xylene through an isomerization and transalkylation unit. In addition, the steam cracking device for producing light olefins in China also mainly takes naphtha as a raw material, so that the raw materials for producing aromatics and olefins compete with each other, and the cost of raw materials for producing aromatics and olefins is high. Therefore, the search for lower cost and diversified raw materials for producing aromatics and olefins is a key factor for solving the bottleneck of the production of aromatics and olefins in the future.

With the application and popularization of new energy technology and the upgrading of gasoline in China, the demand of motor gasoline in the future tends to be reduced, and the content requirements of aromatics and olefins in the gasoline are further reduced. Therefore, the directional conversion of a part of the inferior gasoline into high-value $C_8$ aromatics and the co-production of olefins are effective ways for widening the utilization of gasoline, and can relieve the shortage of raw materials for producing p-xylene.

Chinese patent publication No. CN101767035B discloses a catalyst for producing BTX aromatic hydrocarbon by catalytically cracking gasoline and preparation thereof, wherein the catalyst comprises 0.05-2.0 wt % of Group VIII noble metal, 0.2-5.0 wt % of Zn, 0.2-5.0 wt % of Sn, and 5.0-80 wt % of ZSM-5/ZSM-11 cocrystallized molecular sieve, has good aromatization activity, BTX selectivity, sulfur resistance and olefin resistance, and can be used for producing aromatic hydrocarbons from catalytic cracking gasoline and/or straight-run gasoline, or blended with gasoline fractions such as coking gasoline, cracking gasoline, and the like.

Chinese patent application publication No. CN1923965A discloses a method for producing ethylene, propylene and aromatic hydrocarbons from catalytic cracking gasoline, in which a raw material is contacted with a catalyst once for converting into a mixture of ethylene, propylene and aromatic hydrocarbons.

However, existing methods still have the problems of low comprehensive utilization of hydrocarbon mixtures and low product value.

SUMMARY OF THE INVENTION

An object of the present application is to provide a novel method and system for processing hydrocarbon mixtures, which can realize efficient comprehensive utilization of hydrocarbon mixtures and improve product value.

To achieve the above object, in one aspect, the present application provides a method for processing a hydrocarbon-containing mixture, comprising the steps of:

I) separating the hydrocarbon-containing mixture into a light fraction and a heavy fraction, wherein the light fraction is a $C_7^-$ component and the heavy fraction is a $C_8^+$ component or the light fraction is a $C_5^-$ component and the heavy fraction is a $C_6^+$ component;

II) reacting the light fraction from step I) in an aromatization unit and separating the resulting reaction product into a $C_5^-$ component and a $C_6^+$ component, wherein the reaction occurring in the aromatization unit includes aromatization reaction;

III) reacting the heavy fraction from step I) and optionally the $C_6^+$ component from step II) in an aromatics conversion unit and separating the resulting reaction product into a $C_5^-$ component, a $C_6$-$C_7$ component, a $C_8$ component, and a $C_9^+$ component, wherein the reaction occurring in the aromatics conversion unit includes transalkylation reaction; and IV) optionally, catalytically cracking at least a part of one or both of the $C_5^-$ component from step II) and the $C_5^-$ component from step III), or subjecting it to steam cracking optionally after hydrogenation saturation.

Preferably, the method further comprises one or both of the following steps:

V) purifying the $C_8$ component from step III) to obtain $C_8$ aromatic hydrocarbon(s) and a non-aromatic component, and optionally cracking at least a part of the resulting non-aromatic component together with the $C_5^-$ component in step IV); and VI) recycling at least a part of one or more of the $C_6$-$C_7$ component and the $C_9$+ component from step III) to the aromatics conversion unit of step III) for further reaction.

In another aspect, the present application provides a method for processing a hydrocarbon-containing mixture, comprising the steps of:

1) separating the hydrocarbon-containing mixture into a light fraction and a heavy fraction, wherein the light fraction is a $C_7^-$ component and the heavy fraction is a $C_8^+$ component or the light fraction is a $C_5^-$ component and the heavy fraction is a $C_6^+$ component;

2) reacting the light fraction from step 1) in the presence of an aromatization catalyst, and separating the resulting reaction product into a $C_5^-$ component and a $C_6^+$ component;

3) reacting the heavy fraction from step 1) and optionally the $C_6^+$ component from step 2) in the presence of an aromatics conversion catalyst, and separating the resulting reaction product into a $C_5^-$ component, a $C_6$-$C_7$ component, a $C_8$ component and a $C_9^+$ component; and 4) optionally, catalytically cracking at least a part of one or both of the $C_5^-$ component from step 2) and the $C_5^-$ component from step 3), or subjecting it to steam cracking optionally after hydrogenation saturation.

Preferably, the method further comprises one or both of the following steps:

5) purifying the $C_8$ component from step 3) to obtain $C_8$ aromatic hydrocarbon(s) and a non-aromatic component, and optionally cracking at least a part of the non-aromatic component together with the $C_5^-$ component in step 4); and 6) recycling at least a part of one or more of the $C_6$-$C_7$ component and the $C_9+$ component from step 3) for further reaction in the presence of the aromatics conversion catalyst in step 3).

In yet another aspect, the present application provides a system for carrying out the method for processing hydrocarbon-containing mixture according to the present application, comprising:

a separation unit for separating the hydrocarbon-containing mixture into the light fraction and the heavy fraction;

an aromatization unit for reacting the light fraction from the separation unit and separating the resulting reaction product to obtain a $C_5^-$ component and a $C_6^+$ component;

an aromatics conversion unit for reacting the heavy fraction from the separation unit and optionally the $C_6^+$ component from the aromatization unit and separating the resulting reaction product to obtain a $C_5^-$ component, a $C_6$-$C_7$ component, a $C_8$ component and a $C_9^+$ component;

optionally, a cracking unit for catalytically cracking at least a part of one or both of the $C_5^-$ component from the aromatization unit and the $C_5^-$ component from the aromatics conversion unit, or subjecting it to steam cracking optionally after hydrogenation saturation; and optionally, a hydrogenation saturation unit for hydrogenating at least a part of one or both of the $C_5^-$ component from the aromatization unit and the $C_5^-$ component from the aromatics conversion unit to saturation.

Preferably, the system further comprises: an aromatics purification unit for purifying the $C_8$ component from the aromatics conversion unit to obtain a $C_8$ aromatic hydrocarbon(s) and a non-aromatic component.

In the method and system according to the present application, after the separation of the hydrocarbon-containing mixture, the light fraction rich in alkane and olefin is subjected to aromatization reaction to convert non-aromatic components into aromatic hydrocarbon product, and meanwhile, the resulting byproduct light hydrocarbon can be used as a high-quality raw material for light olefin production; the heavy fraction rich in aromatic hydrocarbons is subjected to reactions such as hydrocracking, transalkylation and the like to convert benzene, toluene and heavy aromatics into $C_8$ aromatic hydrocarbon(s), and meanwhile, the resulting byproduct light hydrocarbon can be used as a high-quality raw material for light olefin production; and finally, the $C_8$ aromatic hydrocarbon(s) can be purified in the aromatics purification unit. Through the above process, low-value hydrocarbon mixtures can be converted into $C_8$ aromatic hydrocarbon(s) and cracking raw materials, thereby improving the product value.

By using the method according to the present application, the aromatics content in the reaction product of the aromatization unit is increased by 15% or more, preferably 20% or more, compared with the raw material; the $C_8$ aromatics content in the reaction product of the aromatics conversion unit is increased by at least 20%, preferably by at least 30%, compared with the raw material; the purity of the C8 aromatic hydrocarbon product of the aromatics purification unit can reach 99% or more; the resulting $C_5^-$ light hydrocarbon component can be directly used as a cracking raw material or used as a steam cracking raw material after hydrogenation saturation.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
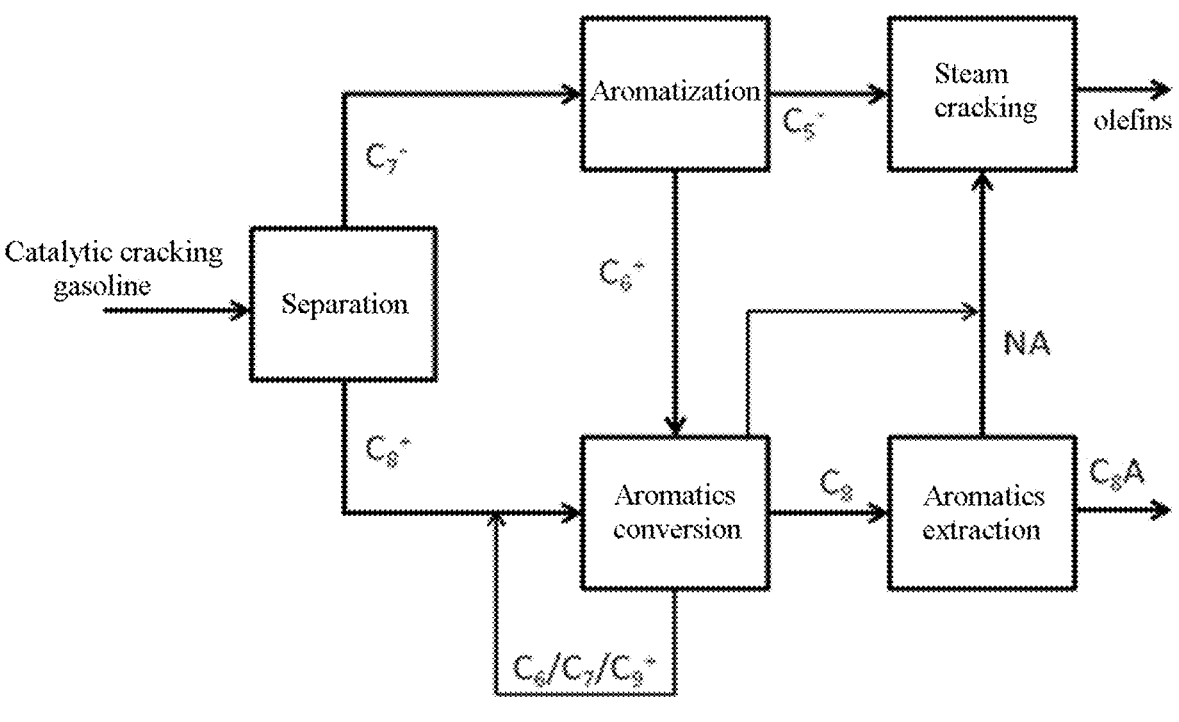
FIG. 1 is a schematic flow diagram of a preferred embodiment of the method according to the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, the $C_5^-$ component refers to a hydrocarbon component having a boiling point lower than that of benzene; the $C_6^+$ component refers to a hydrocarbon component having a boiling point not lower than that of benzene; the $C_7^-$ component refers to a hydrocarbon component having a boiling point not higher than that of toluene; the $C_8^+$ component refers to a hydrocarbon component having a boiling point higher than that of toluene.

In the context of the present application, the $C_6$-$C_7$ component refers to a hydrocarbon component having a boiling point between the boiling points of benzene and xylene; while the $C_8$ component refers to a hydrocarbon component having a boiling point at the vicinity (e.g., ±10° C.) of that of xylene and the $C_9^+$ component refers to a hydrocarbon component having a boiling point higher than that of xylene.

In the context of the present application, high-purity $C_8$ aromatic hydrocarbon(s) refers to $C_8$ aromatic hydrocarbon(s) that meet the purity requirement for adsorptive separation or crystallization separation of para-xylene, which requirement is typically greater than 99%.

In the present application, the mediate strong acid content of the catalyst is calculated according to the peak area within a temperature range of 200-400° C. of its $NH_3$-TPD pattern; the ratio of the mediate strong acid content to the total acid content refers to the ratio of the peak area within a temperature range of 200-400° C. to the total peak area within a temperature range of 100-600° C. of the $NH_3$-TPD pattern.

In the context of the present application, unless otherwise indicated, all pressures given are gauge pressures.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

As mentioned above, in a first aspect, the present application provides a method for processing a hydrocarbon-containing mixture, comprising the steps of:

I) separating the hydrocarbon-containing mixture into a light fraction and a heavy fraction, wherein the light fraction is a $C_7^-$ component and the heavy fraction is a $C_8^+$ component or the light fraction is a $C_5^-$ component and the heavy fraction is a $C_6^+$ component;

II) reacting the light fraction from step I) in an aromatization unit and separating the resulting reaction product into a $C_5^-$ component and a $C_6^+$ component, wherein the reaction occurring in the aromatization unit includes aromatization reaction;

III) reacting the heavy fraction from step I) and optionally the $C_6^+$ component from step II) in an aromatics conversion unit and separating the resulting reaction product into a $C_5^-$ fraction, a $C_6$-$C_7$ component, a $C_8$ component, and a $C_9^+$ component, wherein the reaction occurring in the aromatics conversion unit includes transalkylation reaction; and IV) optionally, catalytically cracking at least a part of one or both of the $C_5^-$ component from step II) and the $C_5^-$ component from step III), or subjecting it to steam cracking optionally after hydrogenation saturation.

In a preferred embodiment, the method further comprises one or both of the following steps:

V) purifying the $C_8$ component from step III) to obtain $C_8$ aromatic hydrocarbon(s) and a non-aromatic component, and optionally cracking at least a part of the resulting non-aromatic component together with the $C_5^-$ component in step IV); and VI) recycling at least a part of one or more of the $C_6$-$C_7$ component and the $C_9^+$ component from step III) to the aromatics conversion unit of step III) for further reaction.

In a second aspect, the present application provides a method for processing a hydrocarbon-containing mixture, comprising the steps of:

1) separating the hydrocarbon-containing mixture into a light fraction and a heavy fraction, wherein the light fraction is a $C_7^-$ component and the heavy fraction is a $C_8^+$ component or the light fraction is a $C_5^-$ component and the heavy fraction is a $C_6^+$ component;

2) reacting the light fraction from step 1) in the presence of an aromatization catalyst, and separating the resulting reaction product into a $C_5^-$ component and a $C_6^+$ component;

3) reacting the heavy fraction from step 1) and optionally the $C_6^+$ component from step 2) in the presence of an aromatics conversion catalyst, and separating the resulting reaction product into a $C_5^-$ component, a $C_6$-$C_7$ component, a $C_8$ component and a $C_9^+$ component; and 4) optionally, catalytically cracking at least a part of one or both of the $C_5^-$ component from step 2) and the $C_5^-$ component from step 3), or subjecting it to steam cracking optionally after hydrogenation saturation.

In a preferred embodiment, the method further comprises one or both of the following steps:

5) purifying the $C_8$ component from step 3) to obtain $C_8$ aromatic hydrocarbon(s) and a non-aromatic component, and optionally cracking at least a part of the non-aromatic component together with the $C_5^-$ component in step 4); and 6) recycling at least a part of one or more of the $C_6$-$C_7$ component and the $C_9^+$ component from step 3) for further reaction in the presence of the aromatics conversion catalyst in step 3).

According to the present application, the separation in step I)/step 1), step II)/step 2) and step III)/step 3) is carried out by separating the mixture into components having different boiling points or boiling ranges through distillation, rectification or fractionation according to their boiling points. For example, in step I)/step 1), the hydrocarbon-containing mixture can be separated into a $C_7^-$ component and a $C_8^+$ component by separation in a rectification column, or into a $C_5^-$ component and a $C_6^+$ component by separation in a distillation column. The specific separation conditions used in step II)/step 2) and step III)/step 3) can be easily determined by those skilled in the art in view of the targeted component to be separated, of which the detailed description is omitted herein for brevity.

The hydrocarbon-containing mixture suitable for use in the present application can be various hydrocarbon mixtures comprising C3-C12 hydrocarbons, in which one or more of C3-C12 hydrocarbons can be absent, so long as the separation of the mixture into the light fraction and the heavy fraction in step I) or step 1) is not affected. In a preferred embodiment, the hydrocarbon-containing mixture has a distillation range of 40 to 300° C., more preferably 50 to 250° C. In a more preferred embodiment, the hydrocarbon-containing mixture is selected from the group consisting of catalytic cracking gasoline, hydrocracking gasoline, ethylene cracking gasoline, straight-run naphtha, catalytic reformate, LPG, any mixtures thereof, or other fractions having similar composition, such as catalytic diesel oil or hydrocracking products thereof, etc.

In preferred embodiments, the hydrocarbon-containing mixture has one or more of the following characteristics:

a sulfur content of 0.5-4 ppm by weight;
a nitrogen content of 0-2 ppm by weight;
an aromatics content of 15-45% by weight;
an olefin content of 20-45% by weight; and
an alkane content of 20-40% by weight.

The hydrocarbon-containing mixture according to the preferred embodiment described above can be more efficiently utilized by processing with the method according to the present application.

According to the present application, after the separation of the hydrocarbon-containing mixture, the light fraction rich in alkane and olefin is subjected to aromatization reaction to convert non-aromatic components into aromatic hydrocarbon product, and meanwhile, the resulting byproduct light hydrocarbon can be used as a high-quality raw material for light olefin production; the heavy fraction rich in aromatic hydrocarbons is subjected to reactions such as hydrocracking, transalkylation and the like to convert benzene, toluene and heavy aromatics into $C_8$ aromatic hydrocarbon(s), and meanwhile, the resulting byproduct light hydrocarbon can be used as a high-quality raw material for light olefin production. The $C_8$ aromatic hydrocarbon(s) can be purified, for example in the aromatics purification unit, to obtain high-purity $C_8$ aromatic hydrocarbon(s). Through the above process, low-value hydrocarbon mixtures can be converted in the method according to the present application into $C_8$ aromatic hydrocarbon(s) and cracking raw materials for producing light olefins, thereby improving the product value.

In a preferred embodiment, the aromatics content of the reaction products of step II) and step 2) is increased by 15% or more compared with the raw material, and more preferably, the aromatics content of the reaction products is increased by 20% or more compared with the raw material.

In a preferred embodiment, the $C_8$ aromatics content of the reaction products of step III) and step 3) is increased by at least 20% compared with the raw material; more preferably, the $C_8$ aromatics content of the reaction products is increased by at least 30% compared with the raw material.

In a preferred embodiment, the $C_8$ aromatic product obtained in step V) and step 5) has a purity of greater than 99% by weight.

In the present application, the aromatization catalyst used in the aromatization unit of step II) and the aromatization catalyst used in step 2) may be those conventionally used, for example, may comprise 50 to 90 wt % of a molecular sieve, which may be selected from the group consisting of aluminosilicates, aluminogallosilicates, aluminosilicophosphates, aluminoferrosilicates having a ten- or twelve-membered ring pore structure, and combinations thereof, and 0.5 to 10 wt % of a modifying metal, which may be selected from the group consisting of Group IB, Group IIB, Group VIB, Group VIIB, Group VIII metals, and combinations thereof.

In a preferred embodiment, the reaction conditions in step II) and step 2) include: a reaction temperature of 400-600° C., a reaction pressure of 0.2-3 MPa, and a feeding space velocity of 0.5-5 h$^{-1}$.

In the present application, the aromatics conversion catalyst used in the aromatics conversion unit of step III) and the aromatics conversion catalyst used in step 3) may be conventional aromatics conversion catalysts, for example, may comprise 50 to 90 wt % of a molecular sieve, which may be selected from the group consisting of aluminosilicates having a ten- or twelve-membered ring pore structure, etc., such as ZSM-5 molecular sieve, ZSM-12 molecular sieve, MCM-22 molecular sieve, MOR molecular sieve and β molecular sieve, and 0.05 to 10 wt % of a modifying metal, which may be selected from the group consisting of Group VB, VIB, VIIB, VIII metals or metal oxides thereof, preferably from Pt, Mo and Re.

In a preferred embodiment, the aromatics conversion catalyst comprises a molecular sieve component, an active metal component and an oxide additive, the active metal component is immobilized on the molecular sieve component and can be in the form of metal elements and/or metal oxides, wherein the active metal in the active metal component is one or more selected from the group consisting of Group VB metals, Group VIB metals and Group VIIB metals, the molecular sieve component is at least one selected from the group consisting of MCM-22 molecular sieve, MOR molecular sieve and ZSM-12 molecular sieve, and the catalyst has a mediate strong acid content of 0.05-2.0 mmol/g of catalyst, and a ratio of the mediate strong acid content to the total acid content of 60-99%.

In a preferred embodiment, the catalyst has a mediate strong acid content of 0.1 to 1 mmol/g, a ratio of the mediate strong acid content to the total acid content of 68-92%.

In the present application, due to the hydrogen migration effect of the metal surface and the synergistic effect of the metal surface and the acid site of the molecular sieve, the metal component immobilized on the surface of the molecular sieve can preferentially cover or weaken a part of the strong acid center and exhibit a synergistic effect with the acid site of nearby molecular sieve(s), so that the effects of promoting the transalkylation and isomerization reactions, and reducing the deep hydrocracking side reaction can be achieved.

In a preferred embodiment, the active metal component is immobilized on the molecular sieve component by physical mixing and/or chemical bonding.

In a preferred embodiment, based on the total weight of the catalyst as 100%, the molecular sieve component is present in an amount of 50 to 90 wt %, preferably 60 to 80 wt %, the oxide additive is present in an amount of 5 to 40 wt %, preferably 20 to 40 wt %, and the active metal component, calculated as metal element, is present in an amount of 0.01 to 10 wt %, preferably 0.1 to 8 wt %.

According to the present application, all active metals meeting the requirements set forth herein before can be used, for example the active metal may be one or more selected from the group consisting of Group VB metals, Group VIB metals and Group VIIB metals, preferably one or more of Mo, W and Re; more preferably at least two of Mo, Re and W at a mixing ratio of 0.1-10:1 by weight, calculated as metal element; or a combination of Mo, Re and W, at a weight ratio of Mo, Re and W of 1:0.1-0.4:0.1-0.6.

According to the present application, the oxide additive may be selected within a wide range, and all conventional oxide additives can be used in the present application, and are preferably one or more selected from the group consisting of alumina, silica, magnesia, titania, zirconia and kaolin.

According to the present application, the aromatics conversion catalyst preferably further comprises a phosphorus-containing component, more preferably the phosphorus-containing component is immobilized on the molecular sieve component by physical mixing and/or chemical bonding, and the phosphorus content is preferably 0.1 to 5 wt % calculated as $P_2O_5$.

Aromatics conversion catalysts meeting the aforementioned requirements of the present application may be used, of which the preparation method is not particularly limited. In a preferred embodiment, the aromatics conversion catalyst may be prepared by: a) immobilizing an active metal and/or active metal oxide on a molecular sieve; and b) shaping the product from step a) with an oxide additive by kneading to obtain the catalyst. In the present application, the active metal and/or active metal oxide is immobilized on the molecular sieve and then shaped by kneading with the oxide additive, and due to the synergistic effect of the metal and the acid center of the molecular sieve and the modulation effect of the metal on acidity, and by providing a specific distribution of the active metal on the catalyst, the strong acid center of the molecular sieve can be effectively reduced and the mediate strong acid center of the molecular sieve can be effectively increased, thereby promoting the conversion efficiency of aromatic hydrocarbons, improving the selectivity of xylene and inhibiting the deep hydrocracking side reaction.

In a further preferred embodiment, the aromatics conversion catalyst may be prepared by a method comprising the steps of: a) impregnating a molecular sieve component source with an active metal source solution, and carrying out a heat treatment to obtain a modified molecular sieve; and b) shaping the modified molecular sieve with an oxide additive source by kneading. In the present application, the impregnation may be isovolumetric impregnation, supersaturated impregnation, or the like, preferably supersaturated impregnation.

In a still further preferred embodiment, in step a), the heat treatment comprises roasting or a combination of drying and roasting, preferably a combination of drying and roasting.

In the present application, the drying conditions may be selected within a wide range, and all conventional drying conditions can be used in the present application, and preferred drying conditions include: a temperature of 50-200° C., and a drying time that can be adjusted depending on the temperature, which is preferably 1-30 h.

In the present application, the roasting conditions can be selected within a wide range, and all conventional roasting conditions can be used in the present application, and preferred roasting conditions include: a temperature of 300-700° C., and a roasting time that can be adjusted depending on the temperature, which is preferably 1-30 h. More preferably, the roasting is performed in an oxygen-containing atmosphere, such as an air atmosphere, and particularly preferably, the oxygen-containing atmosphere is a mixed gas of air and steam at a volume ratio of 5-100:1.

According to the present application, the active metal source may be selected within a wide range, for example, may be a soluble compound of the active metal, preferably a soluble compound containing a metal selected from Group VB, VIB and VIIB metals, such as nitrate, chloride, sulfate, and ammonium salt, of which a detailed description is omitted herein for brevity.

In the present application, the oxide additive source may be, for example, one or more selected from the group consisting of alumina, silica, magnesia, titania and kaolin, or precursors thereof.

According to the present application, step a) is preferably carried out in the presence of a phosphorus source, more preferably the phosphorus source is a soluble compound, of which the type is not particularly limited, such as phosphoric acid, ammonium hydrogen phosphate, and ammonium dihydrogen phosphate, of which a detailed description is omitted herein for brevity.

The aromatics conversion catalyst of the present application has the advantages of high reaction activity, low loss rate of aromatic hydrocarbon and the like when used for aromatics conversion.

The aromatics conversion catalyst of the present application may be reduced as necessary before use. The reduction step has no particular requirements, and may be carried out, for example, by introducing hydrogen for reduction or using other reducing agents, of which a detailed description is omitted herein for brevity.

In a preferred embodiment, the reaction conditions in step III) and step 3) include: a reaction temperature of 250-500° C., a reaction pressure of 1.5-6.5 MPa, a hydrogen-to-hydrocarbon molar ratio of 1-10, and a feeding weight hourly space velocity of 0.5-5 $h^{-1}$.

According to the present application, the steam cracking and catalytic cracking of step IV) and step 4) may be carried out in a conventional manner, and there is no particular requirement in the present application. In certain preferred embodiments, the operating conditions for steam cracking in step IV) and step 4) include: a cracking temperature of 600-1000° C., a residence time of 0.01-0.8 s, and a reaction pressure of 0.1-0.3 MPa (G). In other preferred embodiments, the catalytic cracking of step IV) and step 4) is carried out in the presence of a catalyst comprising a USY molecular sieve, a ZSM-5 molecular sieve or a R molecular sieve; more preferably, the operating conditions for the catalytic cracking include: a reaction temperature of 450-650° C., a weight hourly space velocity of 0.5-20 $h^{-1}$, a reaction pressure of 0.05-0.5 MPa, a catalyst-to-oil mass ratio of 0.1-10, and preferably include: a reaction temperature of 500-600° C., a weight hourly space velocity of 1-10 $h^{-1}$, a reaction pressure of 0.1-0.3 MPa, and a catalyst-to-oil ratio of 0.3-6.

In a preferred embodiment, the cracking raw material is subjected to hydrogenation saturation in step IV) and step 4) prior to the steam cracking. The operation conditions for the hydrogenation saturation may be selected within a wide range, and the main purpose of the hydrogenation saturation is to saturate the olefin component in the raw material so as to increase the alkane content of the product, thereby facilitating the improvement of the yield of olefin product of the subsequent steam cracking.

In a preferred embodiment, the operating conditions for the hydrogenation saturation include: a reaction temperature of 150-600° C., a reaction pressure of 0.5-6 MPa, a feeding weight hourly space velocity of 0.5-10 $h^{-1}$, and a hydrogen-to-hydrocarbon volume ratio of 200-2000.

According to the present application, the catalyst used for the hydrogenation saturation may be those conventionally used, and, for example, the catalyst may comprise 0.1 to 20% by weight of a metal component that is one or more selected from the group consisting of Ni, Mo, Co, Pt, and Pd, and 80 to 99.9% by weight of a carrier component that is one or more selected from the group consisting of alumina, kaolin, magnesia, silica, titania, calcium oxide, and amorphous silica-alumina.

In a preferred embodiment, the purification of step V) and step 5) is aromatics extraction separation, non-aromatics selective cracking, or a combination thereof.

According to the present application, the aromatics extraction separation can be carried out in a conventional manner, and there is no particular requirement herein. In a preferred embodiment, the aromatics extraction separation is carried out by extractive distillation using sulfolane solvent.

According to the present application, the non-aromatics selective cracking may be carried out in a conventional manner, and there is no particular requirement herein. In a preferred embodiment, the non-aromatics selective cracking is carried out in the presence of a catalyst comprising 50-80 wt % of a molecular sieve that is at least one of ZSM-5 molecular sieve, MCM-22 molecular sieve, MOR molecular sieve and β molecular sieve, and optionally 0.1-10 wt % of a metal component comprising a metal selected from Groups VIB, VIIB and VIII. Still further preferably, the operating conditions for the non-aromatics selective cracking include: a reaction temperature of 300-600° C., a reaction pressure of 0.5-3.0 MPa, a hydrogen-to-hydrocarbon molar ratio of 1-10, and a feeding weight hourly space velocity of 1-15 $h^{-1}$.

In a second aspect, the present application provides a system for carrying out the method for processing hydrocarbon-containing mixture according to the present application, comprising:

a separation unit for separating the hydrocarbon-containing mixture into the light fraction and the heavy fraction;

an aromatization unit for reacting the light fraction from the separation unit and separating the resulting reaction product to obtain a $C_5^-$ component and a $C_6^+$ component;

an aromatics conversion unit for reacting the heavy fraction from the separation unit and optionally the $C_6^+$ component from the aromatization unit and separating the resulting reaction product to obtain a $C_5^-$ component, a $C_6$-$C_7$ component, a $C_8$ component and a $C_9^+$ component;

optionally, a cracking unit for catalytically cracking at least a part of one or both of the $C_5^-$ component from the aromatization unit and the $C_5^-$ component from the aromatics conversion unit, or subjecting it to steam cracking optionally after hydrogenation saturation; and optionally, a hydrogenation saturation unit for hydrogenating at least a part of one or both of the $C_5^-$ component from the aromatization unit and the $C_5^-$ component from the aromatics conversion unit to saturation.

In some embodiments, the separation unit is provided with a hydrocarbon-containing mixture inlet, a light fraction outlet, and a heavy fraction outlet; the aromatization unit is provided with an inlet, a $C_5^-$ component outlet and a $C_6^+$ component outlet; the aromatics conversion unit is provided with an inlet, a $C_5^-$ component outlet, a $C_6$-$C_7$ component outlet, a $C_8$ component outlet and a $C_9^+$ component outlet; the cracking unit is provided with an inlet and a cracking product outlet; wherein the light fraction outlet of the separation unit is in communication with the inlet of the aromatization unit, the heavy fraction outlet of the separation unit is in communication with the inlet of the aromatics conversion unit, and one or both of the $C_5^-$ component outlet of the aromatization unit and the $C_5^-$ component outlet of the aromatics conversion unit are in communication with the inlet of the cracking unit, optionally via the hydrogenation saturation unit.

In a preferred embodiment, the system further comprises:

an aromatics purification unit for purifying the $C_8$ component from the aromatics conversion unit to obtain $C_8$ aromatic hydrocarbon(s) and a non-aromatic component;

preferably, the aromatics purification unit is provided with an inlet, a $C_8$ aromatic hydrocarbon outlet and a non-aromatic component outlet, the $C_8$ component outlet of the aromatics conversion unit is in communication with the inlet of the aromatics purification unit, and the non-aromatic component outlet of the aromatics purification unit is in communication with the inlet of the cracking unit, optionally via the hydrogenation saturation unit.

In a preferred embodiment, the cracking unit may be a steam cracking unit, a catalytic cracking unit, or a combination thereof.

In a preferred embodiment, the aromatics purification unit may be an aromatics extraction separation unit, a non-aromatics selective cracking unit, or a combination thereof.

According to the present application, the separation unit may be in the form of a distillation, rectification or fractionation column commonly used in the art, such as a vacuum rectification column, an atmospheric rectification column or a pressurized rectification column.

According to the present application, the aromatization unit may be in the form of an aromatization reactor commonly used in the art, such as a fixed bed reactor, or a moving bed reactor.

According to the present application, the aromatics conversion unit may be in the form of a fixed bed reactor, such as an axial fixed bed reactor, commonly used in the art.

According to the present application, the steam cracking unit may be in the form of a millisecond furnace or a normal cracking furnace commonly used in the art, such as an ultra short residence time cracking furnace, a short residence time cracking furnace.

According to the present application, the catalytic cracking unit may be in the form of a catalytic cracking reactor commonly used in the art, such as a fixed bed reactor, a fluidized bed reactor, or a riser reactor.

According to the present application, the hydrogenation saturation unit may be in the form of a fixed bed reactor commonly used in the art, such as an axial fixed bed reactor.

According to the present application, the aromatics extraction separation unit may be in the form of a liquid-liquid extractor, an extractive distillation column, or the like commonly used in the art, such as an extractive distillation column using sulfolane solvent.

According to the present application, the non-aromatics selective cracking unit may be in the form of a fixed bed reactor commonly used in the art, such as an axial fixed bed reactor, a radial fixed bed reactor.

In a preferred embodiment, the feed inlet and the discharge outlet of each unit are communicated with the feed inlet and the discharge outlet of relevant units through pipelines as needed, and further preferably, valves are independently arranged on each pipeline for regulating the flow rate.

When used for treating, processing and utilizing hydrocarbon-containing mixtures, the system of the present application can achieve an efficient comprehensive utilization of the hydrocarbon-containing mixture, and improve the product value.

EXAMPLES

The present application will be further illustrated with reference to the following examples, but the present application is not limited thereto.

Preparation Examples of the Aromatics Conversion Catalyst of the Present Application All reagents used in the following preparation examples are commercially available, and have a purity of reagent pure grade.

In the following preparation examples, NH₃-TPD pattern of the resulting catalysts were measured by the following method: 100 mg of a sample crushed into 20-40 meshes was weighed, heated to 500° C. at a heating rate of 10° C./min under flowing nitrogen (30 ml/min), purged at a constant temperature for 30 minutes, cooled to 100° C. after the completion of the heat treatment, subjected to ammonia adsorption by introducing NH₃ gas and kept in the ammonia adsorption for 10 minutes, switched to helium purging (30 ml/min) for 1 hour, and heated to 600° C. by temperature programming at a heating rate of 10° C./min, and then a signal of the NH₃ concentration in the effluent was detected by TCD.

In the following preparation examples, the mediate strong acid content of the catalyst was calculated according to the peak area within a temperature range of 200-400° C. of its NH₃-TPD pattern; the ratio of the mediate strong acid content to the total acid content of the catalyst was the ratio of the peak area within a temperature range of 200-400° C. to the total peak area within a temperature range of 100-600° C. of its NH₃-TPD pattern.

In the following preparation examples, TEM images of the resulting catalysts were characterized by a high-resolution field emission transmission electron microscope, the operating voltage was 200 kV, and elemental analysis was performed by an energy scattering X-ray analyzer equipped on the transmission electron microscope.

Preparation Example 1

Figure 4:
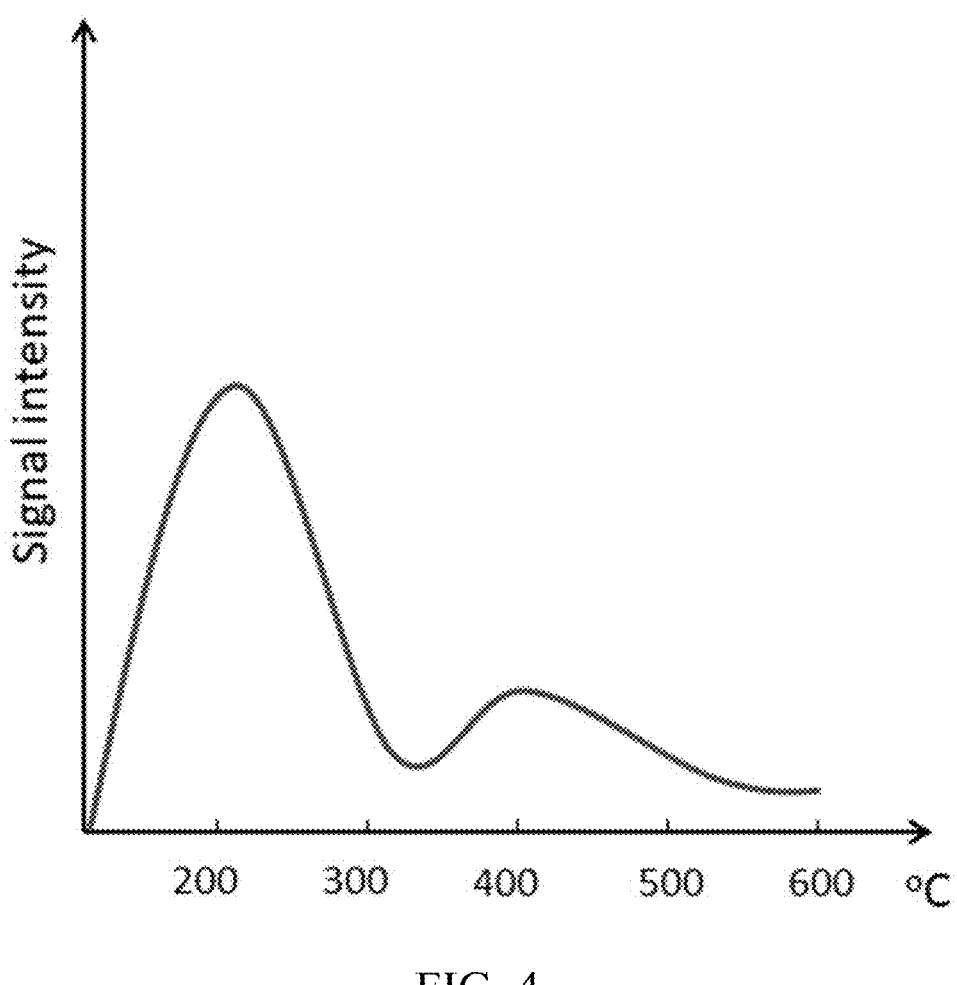
FIG. 4 shows the $NH_3$-TPD pattern of the catalyst obtained in Preparation Example 1 of the present application.

20 g of mordenite was taken, subjected to supersaturated impregnation with an ammonium molybdate solution, and pre-roasted for 3 hours at 400° C. under an air atmosphere to obtain a modified molecular sieve. The modified molecular sieve and 7.7 g of alumina were shaped by kneading, and the resultant was roasted for 2 hours at 550° C. under an air atmosphere to obtain a catalyst A with a molybdenum content of 3 wt %, and the composition and properties of the resulting catalyst are shown in Table 1, and the NH₃-TPD pattern of the resulting catalyst is shown in FIG. 4.

Figure 5:
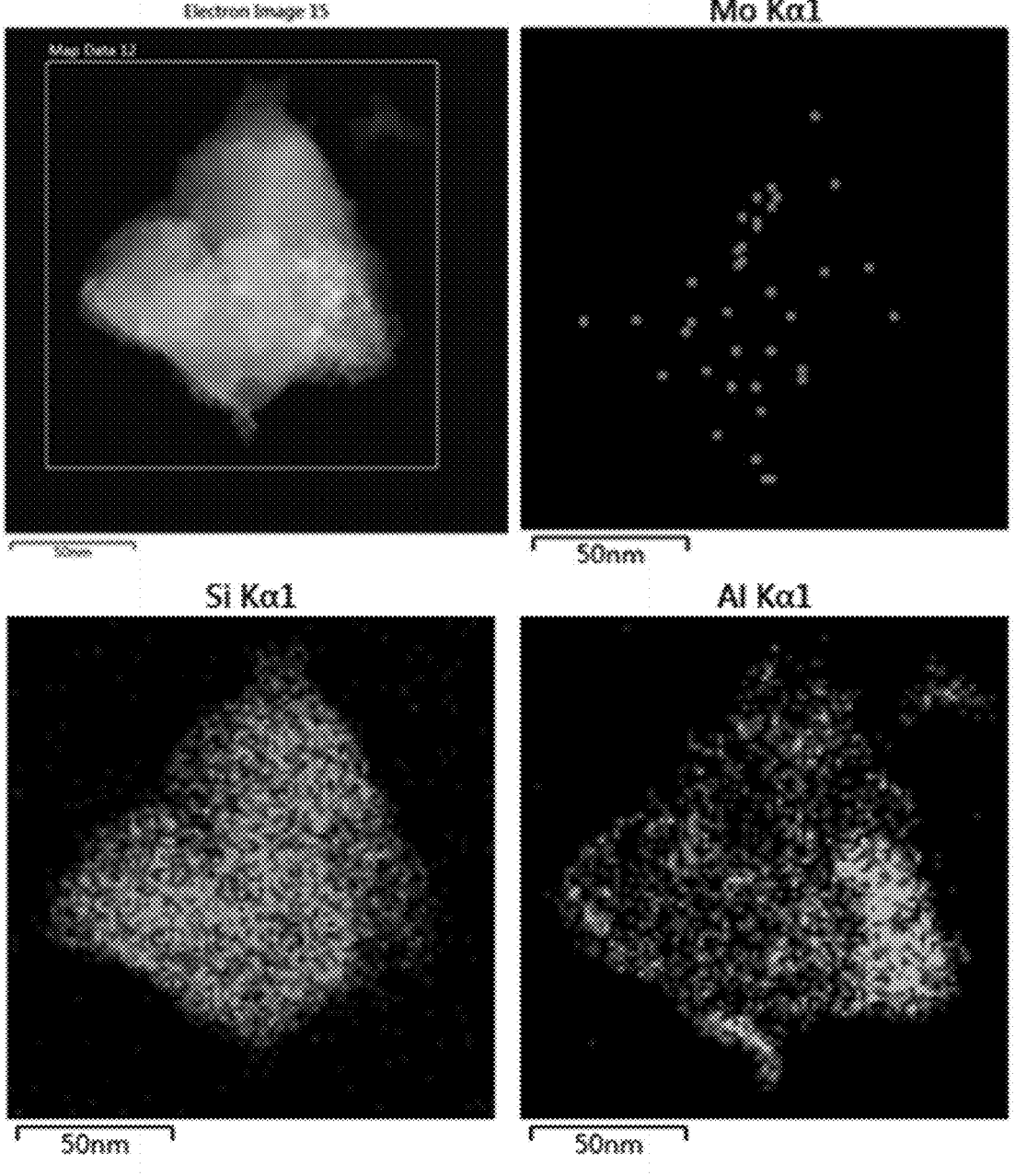
FIG. 5 shows a TEM image of the catalyst obtained in Preparation Example 1 of the present application.

The TEM elemental analysis of the resulting catalyst is shown in FIG. 5, in which the upper left image shows a TEM phase image of the combination of the molecular sieve and alumina, the upper right image shows the distribution of the Mo element, the lower left image shows the distribution of the silicon element, and the lower right image shows the distribution of the aluminum element. From the composition of the resulting catalyst, it can be seen that the silicon-rich portion (see the lower left image) corresponds to the mordenite, while the aluminum-rich portion (see the lower right image) corresponds to the alumina additive, and from the distribution of the Mo element (see the upper right image), it can be seen that the Mo element is mainly distributed on the surface of the mordenite in the catalyst.

Preparation Example 2

20 g of mordenite was taken, subjected to supersaturated impregnation with an ammonium perrhenate solution, and then pre-roasted at 400° C. for 3 hours under an air atmosphere to obtain a modified molecular sieve. The modified molecular sieve and 7.7 g of alumina were shaped by kneading, and the resultant was roasted for 2 hours at 550° C. under an air atmosphere to obtain a catalyst B with a rhenium content of 0.5 wt %, and the composition and properties of the resulting catalyst are shown in Table 1.

Preparation Example 3

20 g of mordenite was taken, subjected to supersaturated impregnation with an ammonium molybdate solution, and then pre-roasted for 3 hours at 400° C. under an air atmosphere to obtain a modified molecular sieve. The modified molecular sieve and 7.7 g of kaolin were shaped by kneading, and the resultant was roasted for 2 hours at 550° C. under an air atmosphere to obtain a catalyst C with a molybdenum content of 1 wt %, and the composition and properties of the resulting catalyst are shown in Table 1.

Preparation Example 4

20 g of MCM-22 molecular sieve was taken, subjected to supersaturated impregnation with an ammonium molybdate solution, and then pre-roasted for 3 hours at 400° C. under an air atmosphere to obtain a modified molecular sieve. The modified molecular sieve and 7.7 g of alumina were shaped by kneading, and the resultant was roasted for 2 hours at 550° C. under an air atmosphere to obtain a catalyst D with a molybdenum content of 3 wt %, and the composition and properties of the resulting catalyst are shown in Table 1.

Preparation Example 5

20 g of MCM-22 was taken, subjected to supersaturated impregnation with an ammonium molybdate solution, and then pre-roasted for 3 hours at 400° C. under an air atmosphere. The modified molecular sieve and 7.7 g of alumina were shaped by kneading, and the resultant was roasted for 2 hours at 550° C. under an air atmosphere to obtain a catalyst E with a molybdenum content of 6 wt %, and the composition and properties of the resulting catalyst are shown in Table 1.

Preparation Example 6

20 g of mordenite was taken, subjected to supersaturated impregnation with a solution containing ammonium dihydrogen phosphate and ammonium molybdate, and then pre-roasted for 3 hours at 400° C. under an air atmosphere. The modified molecular sieve and 7.7 g of alumina were shaped by kneading, and the resultant was roasted for 2 hours at 550° C. under an air atmosphere to obtain a catalyst F with 0.5 wt % of phosphorus and 3 wt % of molybdenum, and the composition and properties of the resulting catalyst are shown in Table 1.

Preparation Example 7

20 g of ZSM-12 was taken, subjected to supersaturated impregnation with an ammonium molybdate solution, and then pre-roasted at 300° C. for 3 hours under an air atmosphere. The modified molecular sieve and 7.7 g of alumina were shaped by kneading, and the resultant was roasted for 2 hours at 550° C. under an air atmosphere to obtain a catalyst G with a molybdenum content of 4 wt %, and the composition and properties of the resulting catalyst are shown in Table 1.

Preparation Example 8

A catalyst was prepared as described in Preparation Example 1, except that a certain amount of mordenite was taken to impregnate with an ammonium molybdate and ammonium tungstate solution under otherwise identical conditions, to obtain a catalyst having a Mo content of 1.5 wt % and a W content of 1.5 wt %, and the composition and properties of the resulting catalyst are shown in Table 1.

Preparation Example 9

A catalyst was prepared as described in Preparation Example 1, except that a certain amount of mordenite was impregnated with a certain amount of ammonium molybdate, ammonium tungstate and ammonium perrhenate solution under otherwise identical conditions, to obtain a catalyst I having a Mo content of 2 wt % and a W content of 0.4 wt % and a Re content of 0.6 wt %, the composition and properties of the resulting catalyst are shown in Table 1.

Preparation Example 10

A catalyst was prepared as described in Preparation Example 1, except that a certain amount of mordenite was impregnated with an ammonium molybdate solution to obtain a modified molecular sieve powder, and the modified molecular sieve was pre-roasted at 400° C. for 3 hours under a mixed atmosphere of air and steam (at a volume ratio of air to steam of 20:1). Other conditions for preparing the catalyst were the same to obtain a catalyst J, the composition and properties of which are shown in Table 1.

Preparation Example 11

A catalyst was prepared as described in Preparation Example 1, except that a certain amount of mordenite was impregnated with an ammonium molybdate solution to obtain a modified molecular sieve powder, the modified molecular sieve was roasted under a mixed atmosphere of air and steam (at a volume ratio of air to steam of 5:1) at 400° C. for 3 hours. Other conditions for preparing the catalyst were the same to obtain a catalyst M, and the composition and properties of the resulting catalyst are shown in Table 1.

Preparation Example 12

A catalyst was prepared as described in Preparation Example 1, except that a certain amount of mordenite was impregnated with the ammonium molybdate solution to obtain a modified molecular sieve powder, dried at 120° C. to obtain a modified molecular sieve. 20 g of the modified molecular sieve and 7.7 g of alumina were shaped by kneading, and the resultant was roasted at 550° C. for 2 hours to obtain a catalyst N, the composition and properties of the resulting catalyst are shown in Table 1.

Preparation Example 13

A catalyst was prepared as described in Preparation Example 9, except that a certain amount of mordenite was impregnated with a certain amount of ammonium molybdate, ammonium tungstate and ammonium perrhenate solution to obtain a modified molecular sieve powder, and the modified molecular sieve was pre-roasted at 400° C. for 3 hours under a mixed atmosphere of air and steam (at a volume ratio of air to steam of 20:1) under otherwise identical conditions, to obtain a catalyst O, the composition and properties of the resulting catalyst are shown in Table 1.

TABLE 1

| | | | | | | | | | |
|---|---|---|---|---|---|---|---|---|---|
| Composition of the catalyst obtained in each preparation example | | | | | | | | | |
| Preparation example No. | Catalyst No. | Content of metal component, calculated as metal element, wt % | Type of molecular sieve | Content of molecular sieve component, wt % | Type of oxide additive | Content of oxide additive, wt % | Phosphorus content, calculated as $P_2O_5$, wt % | Mediate strong acid content, mmol/g.cat | Ratio of mediate strong acid content to total acid content, % |
| 1 | A | Mo, 3% | Mordenite | 70 | Alumina | 27 | 0 | 0.53 | 80 |
| 2 | B | Re, 0.5% | Mordenite | 72 | Alumina | 27.5 | 0 | 0.49 | 69 |
| 3 | C | Mo, 1% | Mordenite | 71.5 | Kaolin | 27.5 | 0 | 0.59 | 72 |
| 4 | D | Mo, 3% | MCM-22 molecular sieve | 70 | Alumina | 27 | 0 | 0.40 | 81 |
| 5 | E | Mo, 6% | MCM-22 molecular sieve | 68 | Alumina | 26 | 0 | 0.30 | 86 |
| 6 | F | Mo, 3% | Mordenite | 70 | Alumina | 26.5 | 0.5% | 0.55 | 85 |
| 7 | G | Mo, 4% | ZSM-12 molecular sieve | 69 | Alumina + magnesia | 27 | 0 | 0.41 | 81 |
| 8 | H | Mo, 1.5%; W, 1.5% | Mordenite | 70 | Alumina | 27 | 0 | 0.59 | 82 |
| 9 | I | Mo, 2%; W, 0.4%; Re, 0.6% | Mordenite | 70 | Alumina | 27 | 0 | 0.60 | 85 |
| 10 | J | Mo, 3% | Mordenite | 70 | Alumina | 27 | 0 | 0.49 | 88 |
| 11 | M | Mo, 3% | Mordenite | 70 | Alumina | 27 | 0 | 0.46 | 90 |
| 12 | N | Mo, 3% | Mordenite | 70 | Alumina | 27 | 0 | 0.60 | 76 |
| 13 | O | Mo, 2%; W, 0.4%; Re, 0.6% | Mordenite | 70 | Alumina | 27 | 0 | 0.54 | 90 |

Examples of Method for Processing Hydrocarbon-Containing Mixtures

The following Examples 1-3 illustrate the practice of the processing method of the present application using conventional catalysts, wherein:

Aromatization catalyst: a Zn and Mo modified ZSM-5 molecular sieve, with a Zn content (calculated as metal element) of 5 wt %, a Mo content (calculated as metal element) of 2 wt %, a ZSM-5 molecular sieve content of 70 wt %, and the rest being alumina;

Aromatics conversion catalyst: an Re modified MOR zeolite, with an Re content (calculated as metal element) of 0.5 wt %, a mordenite content of 70 wt %, and the rest being alumina;

Hydrogenation saturation catalyst: a catalyst comprising Pt and Ni supported on an alumina carrier, with a Pt content of 0.1 wt %, a Ni content (calculated as metal element) of 8 wt %, and the rest being an alumina carrier;

Non-aromatics cracking catalyst: a catalyst comprising a ZSM-5/β molecular sieve mixture and Mo supported on the mixture, with a ZSM-5 molecular sieve content of 60 wt %, a β molecular sieve content of 34 wt %, and a Mo content (calculated as metal element) of 6 wt %.

Unless otherwise specified, each catalyst used was prepared by conventional methods known in the art.

Example 1

Referring to the flow chart shown in FIG. 1, 100 tons/hour of catalytic cracking gasoline was subjected to desulfurization and denitrification pretreatment, passed through an atmospheric rectification column for separation into a $C_7^-$ light fraction and a $C_8^+$ heavy fraction. The $C_7^-$ light fraction was sent to an aromatization unit for aromatization reaction, $C_8^-$ light hydrocarbons in the resulting product were used as a cracking raw material, $C_6^+$ component in the resulting product was sent to an aromatics conversion unit for further conversion. The $C_8^+$ heavy fraction was sent to the aromatics conversion unit to carry out reactions such as aromatics transalkylation reaction and non-aromatics hydrocracking reaction, the resulting $C_8$ component was sent to an aromatics extraction unit for purification, the resulting byproduct $C_8^-$ light hydrocarbons were recovered and used as a cracking raw material, and the rest unreacted components were recycled to the aromatics conversion unit. The $C_8$ aromatic hydrocarbon(s) obtained by aromatics extraction was recovered as a product, of which the purity reached 99.8%, and the residual non-aromatic hydrocarbons were used as a cracking raw material.

The composition of the raw material, the reaction conditions of each unit and the product yield of the integrated unit are shown in Table 2, Table 3 and Table 4, respectively.

Example 2

Figure 2:
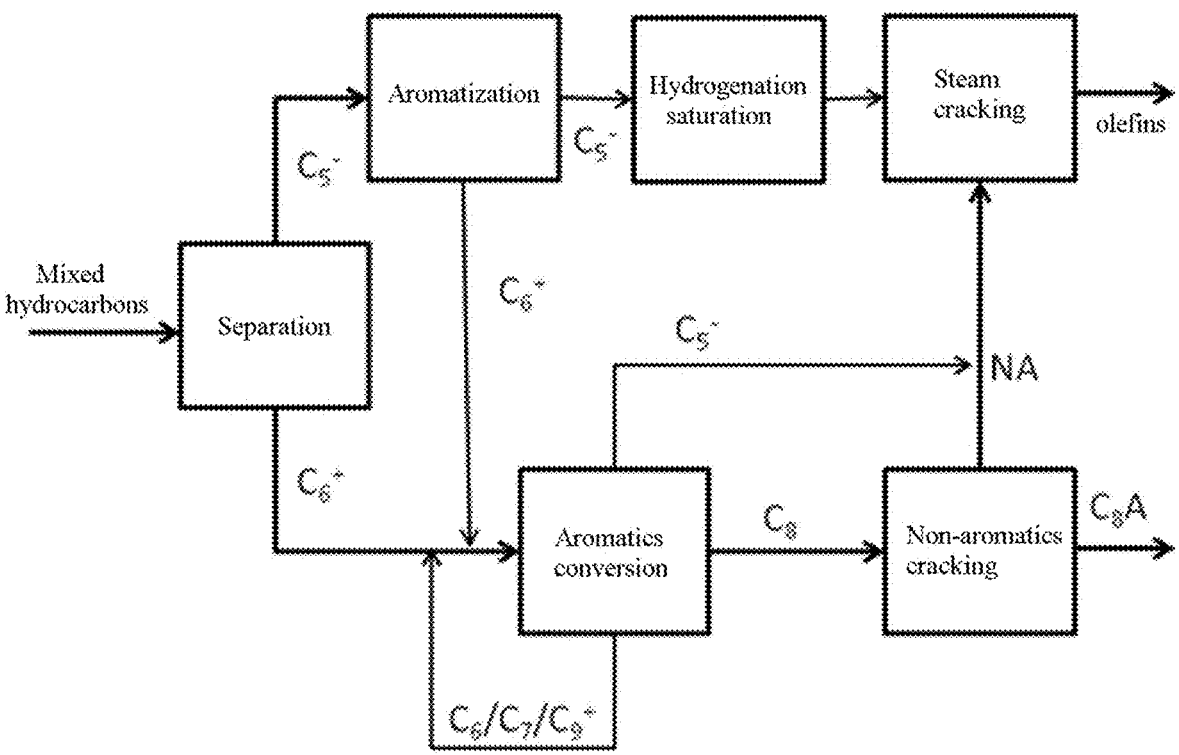
FIG. 2 is a schematic flow diagram of another preferred embodiment of the method according to the present application.

Referring to the flow chart shown in FIG. 2, 100 tons/hour of a mixture of catalytic cracking gasoline and pyrolysis gasoline was subjected to desulfurization and denitrification, passed through an atmospheric rectification column for separation into a $C_5^-$ light fraction and a $C_6^+$ heavy fraction. The $C_5^-$ light fraction was sent to an aromatization unit for aromatization reaction, $C_5^-$ component in the resulting product was used as a cracking raw material after hydrogenation saturation, and $C_6^+$ component in the resulting product was sent to an aromatics conversion unit for further conversion.

The separated $C_6^+$ heavy fraction was sent to the aromatics conversion unit to carry out transalkylation reaction and non-aromatics mild hydrocracking reaction, the resulting $C_8$ component was sent to a non-aromatics cracking unit for further purification, the resulting byproduct $C_5^-$ light hydrocarbons were used as a cracking raw material, and the rest unreacted components were recycled to the aromatics conversion unit. Non-aromatic hydrocarbons underwent selective cracking in the non-aromatics cracking unit, the resulting $C_8$ aromatic hydrocarbon(s) was recovered as a product, of which the purity reached 99.9%, and the resulting byproduct light hydrocarbons (namely non-aromatic component) of the non-aromatics cracking unit was recovered as a cracking raw material.

The composition of the raw material, the reaction conditions of each unit and the product yield of the integrated unit are shown in Table 2, Table 3 and Table 4, respectively.

Example 3

Figure 3:
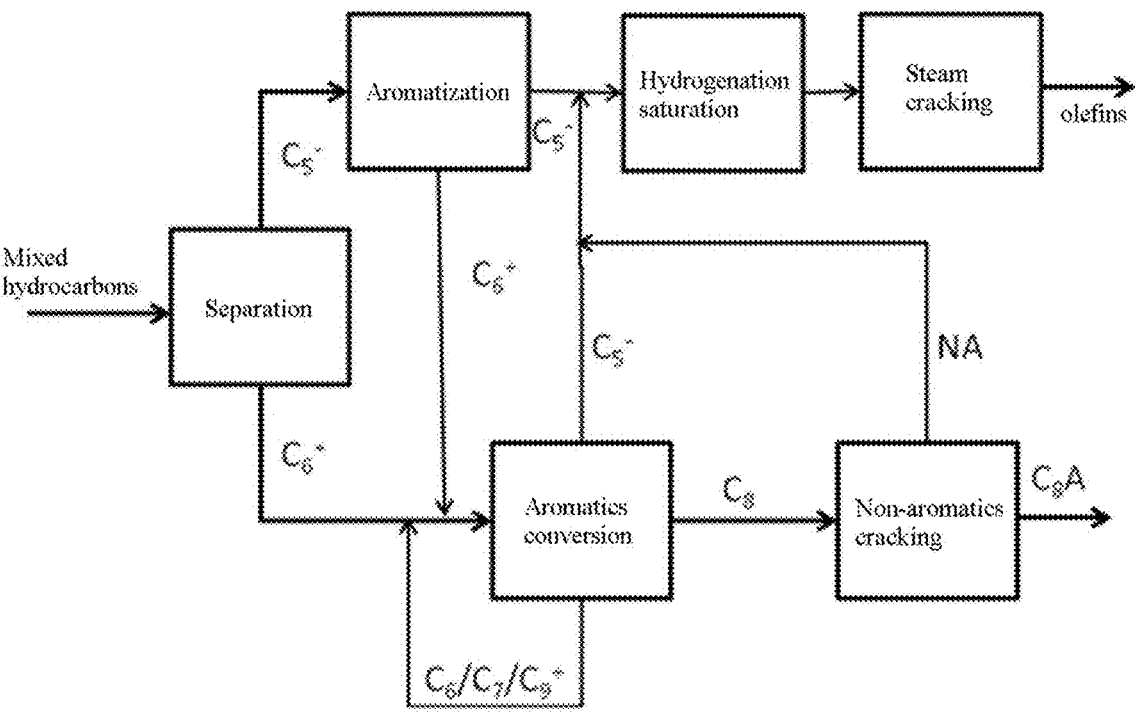
FIG. 3 is a schematic flow diagram of another preferred embodiment of the method according to the present application.

Referring to the flow chart shown in FIG. 3, 100 tons/hour of a mixture of catalytic cracking gasoline and pyrolysis gasoline was subjected to desulfurization and denitrification, and then passed through an atmospheric rectification column for separation into a $C_5^-$ light fraction and a $C_6^+$ heavy fraction. The $C_5^-$ light fraction was sent to an aromatization unit for aromatization reaction, $C_5^-$ component in the resulting product was used as a cracking raw material after hydrogenation saturation, and $C_6^+$ component in the resulting product was sent to an aromatics conversion unit for further conversion. The separated $C_6^+$ heavy fraction was sent to the aromatics conversion unit to carry out transalkylation reaction and non-aromatics mild hydrocracking reaction, the resulting $C_8$ component was sent to a non-aromatics cracking unit for further purification, the resulting byproduct $C_5^-$ light hydrocarbons were used as a cracking raw material after hydrogenation saturation, and the rest unreacted components were recycled to the aromatics conversion unit. Non-aromatic hydrocarbons underwent selective cracking in the non-aromatics cracking unit, the resulting $C_8$ aromatic hydrocarbon(s) was recovered as a product, of which the purity reached 99.9%, and the resulting byproduct light hydrocarbons of the non-aromatics cracking unit were recovered as a cracking raw material after hydrogenation saturation.

The composition of the raw material, the reaction conditions of each unit and the product yield of the integrated unit are shown in Table 2, Table 3 and Table 4, respectively.

TABLE 2

| Composition of the raw materials used in the examples | | | |
|---|---|---|---|
| | Example 1 | Example 2 | Example 3 |
| Raw materials | Catalytic cracking gasoline | Catalytic cracking gasoline + pyrolysis gasoline | Catalytic cracking gasoline + pyrolysis gasoline |
| Sulfur content, ppm-wt | 4 | 2 | 2 |
| Nitrogen content, ppm-wt | 2 | 1 | 1 |
| Aromatics, wt % | 35 | 45 | 45 |
| Olefins, wt % | 25 | 20 | 20 |
| Paraffins, wt % | 40 | 35 | 35 |
| Distillation range, ° C. | 50-190 | 70-210 | 70-210 |

TABLE 3

Operating conditions of Examples 1-3

|  | Example 1 | Example 2 | Example 3 |
|---|---|---|---|
| Reaction unit Aromatization unit |  |  |  |
| Temperature, ° C. | 500 | 550 | 550 |
| Pressure, MPa | 0.5 | 0.2 | 0.2 |
| Mass space velocity, h$^{-1}$ | 1.5 | 1.0 | 1.0 |
| Catalyst | 5 wt % Zn-2 wt % Mo/ZSM-5 | | |
| Hydrogenation saturation unit |  |  |  |
| Temperature, ° C. |  | 200 | 300 |
| Pressure, MPa |  | 2.0 | 2.0 |
| Mass space velocity, h$^{-1}$ |  | 4.0 | 4.0 |
| Hydrogen-to-hydrocarbon volume ratio |  | 800 | 800 |
| Catalyst | 0.1 wt % Pt-8 wt % Ni/Al$_2$O$_3$ | | |
| Aromatics conversion unit |  |  |  |
| Temperature, ° C. | 340 | 360 | 380 |
| Pressure, MPa | 3.0 | 3.0 | 3.0 |
| Mass space velocity, h$^{-1}$ | 2.0 | 2.0 | 2.0 |
| Hydrogen-to-hydrocarbon molar ratio | 3.0 | 4 | 4 |
| Catalyst | 0.5 wt % Re/MOR zeolite catalyst | | |
| Non-aromatics cracking unit |  |  |  |
| Temperature, ° C. |  | 480 | 550 |
| Pressure, MPa |  | 2.0 | 2.0 |
| Mass space velocity, h$^{-1}$ |  | 4.0 | 4.0 |
| Hydrogen-to-hydrocarbon molar ratio |  | 4.0 | 4.0 |
| Catalyst | 6 wt % Mo/(60 wt % ZSM-5 + 34 wt % β molecular sieve) | | |
| Steam cracking unit |  |  |  |
| Temperature, ° C. | 850 | 850 | 850 |
| Time, s | 0.4 | 0.2 | 0.2 |
| Pressure, MPa | 0.2 | 0.1 | 0.1 |

TABLE 4

Test results of Examples 1-3

|  | Example 1 | Example 2 | Example 3 |
|---|---|---|---|
| Products | Yield, t/h | Yield, t/h | Yield, t/h |
| Ethylene | 22 | 21 | 22 |
| Propylene | 16 | 10 | 9 |
| C$_8$ aromatic hydrocarbon(s) | 51 | 61 | 60 |
| Others | 11 | 8 | 9 |

As can be seen from the test results of Table 4, the processing method of the present application can be flexibly used for processing various hydrocarbon-containing mixtures, the resulting products mainly comprise C$_8$ aromatic hydrocarbon(s), ethylene and propylene, the total yield can reach 85% or higher, and in preferred embodiments, the total yield (C$_8$ aromatic hydrocarbon(s)+ethylene+propylene) can reach 92%.

The following examples 4-17 illustrate the practice of the processing method of the present application using the aromatics conversion catalyst of the present application.

Examples 4 to 16

Before use, Catalysts A to O obtained in Preparation Examples 1 to 13 were separately placed in a reactor, and reduced with an introduction of hydrogen gas at 450° C. for 3 hours. Then, a gasoline raw material was processed in the same manner as in Example 1, except that the aromatics conversion catalyst used in Example 1 was replaced with Catalysts A to O with other operating conditions being the same, and the results are shown in Table 5.

Example 17

A gasoline raw material was processed as described in Example 16, except that the steam cracking unit was replaced with a catalytic cracking unit (i.e. a fluidized bed reactor), the reaction temperature was 500° C., the weight hourly space velocity was 5 h$^{-1}$, the catalyst-to-oil ratio was 1, and the pressure was 0.2 MPa, with other operating conditions being the same, and the results are shown in Table 5.

TABLE 5

Test results of Examples 4 to 17

|  | Example 4 (Catalyst A) | Example 5 (Catalyst B) | Example 6 (Catalyst C) |
|---|---|---|---|
| Products | Yield, t/h | Yield, t/h | Yield, t/h |
| Ethylene | 21 | 22 | 23 |
| Propylene | 15 | 15 | 15 |
| C$_8$ aromatic hydrocarbon(s) | 55 | 53 | 52 |
| Others | 9 | 10 | 10 |

|  | Example 7 (Catalyst D) | Example 8 (Catalyst E) | Example 9 (Catalyst F) |
|---|---|---|---|
| Products | Yield, t/h | Yield, t/h | Yield, t/h |
| Ethylene | 20 | 20 | 22 |
| Propylene | 14 | 15 | 14 |
| C$_8$ aromatic hydrocarbon(s) | 53 | 53 | 56 |
| Others | 13 | 12 | 8 |

|  | Example 10 (Catalyst G) | Example 11 (Catalyst H) | Example 12 (Catalyst I) |
|---|---|---|---|
| Products | Yield, t/h | Yield, t/h | Yield, t/h |
| Ethylene | 22 | 20 | 20 |
| Propylene | 15 | 16 | 15 |
| C$_8$ aromatic hydrocarbon(s) | 53 | 56 | 57 |
| Others | 10 | 8 | 8 |

|  | Example 13 (Catalyst J) | Example 14 (Catalyst M) | Example 15 (Catalyst N) |
|---|---|---|---|
| Products | Yield, t/h | Yield, t/h | Yield, t/h |
| Ethylene | 20 | 19 | 23 |
| Propylene | 15 | 15 | 14 |
| C$_8$ aromatic hydrocarbon(s) | 58 | 59 | 53 |
| Others | 7 | 7 | 10 |

|  | Example 16 (Catalyst O) | Example 17 (Catalyst O) |
|---|---|---|
| Products | Yield, t/h | Yield, t/h |
| Ethylene | 19 | 17 |
| Propylene | 14 | 11 |
| C$_8$ aromatic hydrocarbon(s) | 60 | 60 |
| Others | 7 | 12 |

21
22

As can be seen from the test results of Table 5, by using the aromatics conversion catalyst of the present application, the yield of $C_8$ aromatic hydrocarbons can be further increased, and in preferred embodiments, the total yield ($C_8$ aromatic hydrocarbons+ethylene+propylene) can be further increased to 93 wt % or higher.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A method for processing a hydrocarbon-containing mixture, comprising the steps of:
   I) separating the hydrocarbon-containing mixture into a light fraction and a heavy fraction, wherein the light fraction is a $C_7^-$ component and the heavy fraction is a $C_8^+$ component or the light fraction is a $C_5^-$ component and the heavy fraction is a $C_6^+$ component;
   II) reacting the light fraction from step I) in the presence of an aromatization catalyst in an aromatization unit and separating the resulting reaction product into a $C_5^-$ component and a $C_6^+$ component, wherein the reaction occurring in the aromatization unit includes an aromatization reaction;
   III) reacting the heavy fraction from step I) and the $C_6^+$ component from step II) in the presence of an aromatics conversion catalyst in an aromatics conversion unit and separating the resulting reaction product into a $C_5^-$ fraction, a $C_6$-$C_7$ component, a $C_8$ component, and a $C_9^+$ component, wherein the reaction occurring in the aromatics conversion unit includes a transalkylation reaction; and
   IV) catalytically cracking at least a part of one or both of the $C_5^-$ component from step II) and the $C_5^-$ component from step III), or subjecting the at least a part of one or both of the $C_5^-$ component from step II) and the $C_5^-$ component from step III) hydrogenation saturation followed by steam cracking,
   wherein the aromatics conversion catalyst used in the aromatics conversion unit of step III) comprises a molecular sieve component, an active metal component immobilized on the molecular sieve component, and an oxide additive, the aromatics conversion catalyst has a mediate strong acid content of 0.05-2.0 mmol/g catalyst, and a ratio of the mediate strong acid content to the total acid content of 60-99%, and
   wherein the molecular sieve component is selected from MCM-22 molecular sieves, MOR molecular sieves, ZSM-12 molecular sieves, and combinations thereof; the active metal in the active metal component is selected from Group VB metals, Group VIB metals, Group VIIB metals, and combinations thereof; and the oxide additive is selected from alumina, silica, magnesia, titania, zirconia, kaolin, and combinations thereof.

2. The method of claim 1, further comprising one or both of the following steps:
   V) purifying the $C_8$ component from step III) to obtain $C_8$ aromatic hydrocarbon(s) and a non-aromatic component, and optionally cracking at least a part of the resulting non-aromatic component together with the $C_5^-$ component in step IV); and
   VI) recycling at least a part of one or more of the $C_6$-$C_7$ component and the $C_9^+$ component from step III) to the aromatics conversion unit of step III) for further reaction.

3. The method of claim 1, wherein:
   the hydrocarbon-containing mixture comprises C3-C12 hydrocarbons and has a distillation range of 40-300° C.

4. The method of claim 1, wherein:
   the aromatization catalyst used in the aromatization unit of step II) comprises 50 to 90 wt % of a molecular sieve selected from aluminosilicates, aluminogallosilicates, aluminosilicophosphates, aluminoferrosilicates having a ten- or twelve-membered ring pore structure, and combinations thereof, and 0.5 to 10 wt % of a modifying metal selected from Group IB, Group IIB, Group VIB, Group VIIB, and Group VIII metals.

5. The method of claim 1, wherein the aromatics conversion catalyst further comprises a phosphorus-containing component immobilized on the molecular sieve component.

6. The method of claim 1, wherein the active metal is present in the aromatics conversion catalyst in the form of an elemental metal, a metal oxide, or a combination thereof, and is one or more selected from Mo, W, and Re.

7. The method of claim 1, wherein the reaction in step III) is carried out at a temperature of 250-500° C. under a pressure of 1.5-6.5 MPa, a hydrogen-to-hydrocarbon molar ratio of 1-10, and a feeding weight hourly space velocity of 0.5-5 $h^{-1}$.

8. The method of claim 1, wherein the hydrogenation saturation in step IV) is carried out in the presence of a catalyst comprising a metal component selected from Ni, Mo, Co, Pt, Pd, and combinations thereof, and a support component selected from alumina, kaolin, magnesia, silica, titania, calcium oxide, amorphous silica-alumina, and combinations thereof.

9. The method of claim 1, wherein:
   in step IV), the steam cracking reaction is carried out at a temperature of 600-1000° C., for a residence time of 0.01-0.8 s, and under a pressure of 0.1-0.3 MPa; or
   the catalytic cracking reaction is carried out at a temperature of 450-650° C., at a weight hourly space velocity of 0.5-20 $h^{-1}$, under a pressure of 0.05-0.5 MPa, and at a catalyst-to-oil mass ratio of 0.1-10.

10. The method of claim 2, wherein the purifying of step V) comprises subjecting the $C_8$ component to aromatics extraction separation, non-aromatics selective cracking or a combination thereof.

11. The method of claim 1, wherein the hydrocarbon-containing mixture is selected from catalytic diesel oil or hydrogenation products thereof, catalytic cracking gasoline, hydrocracking gasoline, ethylene cracking gasoline, straight-run naphtha, catalytic reformate, LPG, and mixtures thereof.

12. The method of claim 1, wherein the reaction in the aromatization unit of step II) is carried out at a reaction temperature of 400-600° C. under a pressure of 0.2-3 MPa and a feeding weight hourly space velocity of 0.5-5 $h^{-1}$.

13. The method of claim 1, wherein the aromatics conversion catalyst comprises 50 to 90 wt % of the molecular sieve component, 5 to 40 wt % of the oxide additive, and 0.01 to 10 wt % of the active metal component, based on the total weight of the catalyst.

14. The method of claim 5, wherein the phosphorus content, calculated as $P_2O_5$, of the aromatics conversion catalyst is 0.1 to 5 wt %.

15. The method of claim 6, wherein the active metal is a combination of two of Mo, Re and W at a mixing ratio by weight of 0.1-10:1, calculated based on the elemental metal, or the active metal is a combination of Mo, Re and W at a weight ratio of Mo, Re and W of 1:0.1-0.4:0.1-0.6, calculated based on the elemental metal.

16. The method of claim 1, wherein the hydrogenation saturation reaction is carried out at a reaction temperature of 150-600° C. under a pressure of 0.5-6 MPa, a feeding weight hourly space velocity of 0.5-10 $h^{-1}$, and a hydrogen-to-hydrocarbon volume ratio of 200-2000.

17. The method of claim 10, wherein the purifying comprises subjecting the $C_8$ component to extraction separation through extractive distillation using sulfolane solvent; or the purifying comprises subjecting the $C_8$ component to non-aromatics selective cracking in the presence of a catalyst comprising a molecular sieve selected from ZSM-5 molecular sieves, MCM-22 molecular sieves, MOR molecular sieves, β molecular sieves, and combinations thereof, and optionally a metal component selected from Group VIB metals, Group VIIB metals, and Group VIII metals, and the non-aromatics selective cracking is carried out at a reaction temperature of 300-600° C. under a pressure of 0.5-3.0 MPa, a hydrogen-to-hydrocarbon molar ratio of 1-10, and a feeding weight hourly space velocity of 1-15 $h^{-1}$.

* * * * *